United States Patent [19] [11] 3,898,336
Rembaum et al. [45] Aug. 5, 1975

[54] INSOLUBLE POLYMERIC QUATERNARY TRIHALOGEN SALT COATED SUBSTRATES

[75] Inventors: Alan Rembaum; Robert F. Landel, both of Altadena; Hendrik Keyzer, Pasadena, all of Calif.

[73] Assignee: California Institute of Technology, Pasadena, Calif.

[22] Filed: May 11, 1972

[21] Appl. No.: 252,502

Related U.S. Application Data

[62] Division of Ser. No. 36,431, May 11, 1970, Pat. No. 3,778,476.

[52] U.S. Cl. ............ 424/25; 117/100 B; 117/138.5; 117/138.8 F; 117/141; 424/78; 424/329; 117/DIG. 4
[51] Int. Cl. .............................................. B44d 1/44
[58] Field of Search ............... 117/62.1, 62.2, 138.5, 117/138.8 F, 141, DIG. 3, DIG. 4, 100 B; 424/25

[56] References Cited
UNITED STATES PATENTS

| | | | |
|---|---|---|---|
| 2,261,002 | 10/1941 | Ritter | 260/2 |
| 2,271,378 | 1/1942 | Searle | 260/2 |
| 2,679,533 | 5/1954 | Darragh et al. | 260/567 |
| 2,899,340 | 8/1959 | Cohen et al. | 117/138.5 |
| 3,279,981 | 10/1966 | Geiger et al. | 424/329 |

*Primary Examiner*—William D. Martin
*Assistant Examiner*—Theodore G. Davis
*Attorney, Agent, or Firm*—Marvin E. Jacobs

[57] ABSTRACT

A coated substrate is formed by dissolving in solvent a linear quaternary ammonium polymer of the formula:

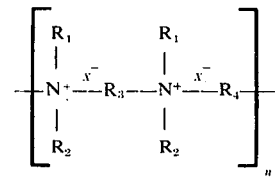

where $R_1$ and $R_2$ are each alkyl of 1–10 carbon atoms; $R_3$ and $R_4$ are each alkylene, alkenylene, arylene, aralkylene, alkarylene, alkyleneoxy, alkylenethio of 1 to 100 carbon atoms; $n$ is an integer greater than 2; and X is a halogen selected from $Cl^-$, $Br^-$ and $I^-$; immersing the substrate in the solution and adding to the solution a halogen source selected from the group consisting of Br and I to precipitate on said substrate an insoluble trihalide salt of said polymer.

18 Claims, No Drawings

INSOLUBLE POLYMERIC QUATERNARY TRIHALOGEN SALT COATED SUBSTRATES

ORIGIN OF INVENTION

The invention described herein was made in the performance of work under a NASA contract and is subject to the provisions of Section 305 of the Nation Aeronautics and Space Act of 1958, Public Law 83-568 (72 Stat. 435; 42 USC 2457).

RELATED APPLICATION

This is a division of application Ser. No. 36,431, filed May 11, 1970, and now U.S. Pat. No. 3,778,476.

BACKGROUND OF THE INVENTION

1. Field of the Invention

The present invention relates to novel polymeric salts and method of making same. More particularly the invention relates to linear polymeric salts having a high concentration of halogens and method of making same.

2. Description of the Prior Art

Linear quaternary ammonium polymers and salts thereof have been known. These materials have been prepared by the reaction of a polyamine with a dihalo organic compound, as for example, disclosed in copending application Ser. No. 678,501 filed Oct. 27, 1967, now abandoned. The resulting water soluble salts from the reaction contain a halogen at each nitrogen center on the backbone of the polymer. The amount of halogen thus contained in the salts is limited to a single halogen per nitrogen center. Further, the amount of halogen is restricted by the separation between the nitrogen centers on the backbone. Typically, as disclosed in the copending application, prior polymer salts of this type have had separations between the nitrogen centers of at least 4 carbon atoms. Additionally, since the salts are water soluble, they are ionized in the presence of water or other similar aqueous type solvents.

The prior art polymer salts have been utilized as polyelectrolyte solutions. Additionally, they have been shown to possess biological properties inhibiting bacterial growth. Inhibition of bacterial growth is attributed to the presence of a halogen in the vicinity of a positive nitrogen of the salt. One problem of the water soluble prior products is that the halogen is immediately ionized in solution and thus its action is very rapid and its effect is shortlived. Further, a single halogen ion per se does not contribute to bacteriocidal properties of this prior product. However, when the anion which is associated with the positive nitrogen center consists of a pure or mixed trihalide, then bacteriocidal properties are developed through slow release of the halogen.

OBJECTS AND SUMMARY OF THE INVENTION

It is an object of this invention to provide novel polymeric organic salts having high halogen content.

It is a further object of this invention to provide a method of synthesizing polymeric organic halogen salts having high halogen content.

Still another object of this invention is to provide water insoluble polymeric halogen salts having high halogen content and a method of making same.

Another object of this invention is to provide a polymeric organic halogen salt on a substrate material and method of making same.

The above and other objects of this invention are accomplished by forming insoluble salts from initially soluble linear polymers containing quaternizable nitrogens. The quaternizable nitrogens can be either in the backbone of the linear polymer or can be disposed in side chains grafted along a polymer backbone. The starting linear polymer material will have associated with the quaternizable nitrogen a single halogen anion generally selected from a class consisting of chlorine, bromine and iodine. The linear polymer containing the quaternizable nitrogens is then dissolved to form a solution thereof. Any suitable solvent for the polymer can be used. The solvent will, of course, vary depending upon the particular polymer but will generally be selected from a group consisting of water and organic solvents, preferably polar organic solvents such as methanol and ethylene glycol.

The dissolved polymer is then contacted with a halogen source. The halogen source will contain a halogen selected from the class consisting of bromine and iodine. A sufficient quantity of the bromine and iodine is added so as to increase the total halogen content of the linear polymer by increasing the amount of halogens at each nitrogen center to the point where an insoluble salt is precipitated from the solution. The reaction is generally carried out at ambient conditions and thus is straightforward and easy to perform. The added halogen selected from a class consisting of Br and I can be added to the solution in the form of either $Br_2$ or $I_2$. However, these materials do not readily go into solution. Thus, it is preferred that there additionally be present an alkali metal halide corresponding to the halogen added, which will aid in the halogen going into solution. For example, in a preferred method of the herein invention, an aqueous solution of potassium iodide, (KI) and iodine ($I_2$) are added to the solution of the starting soluble linear polymer.

It appears that it makes no difference which one of the three possible halogen anions is associated with the quaternized nitrogen in the starting soluble linear polymer, and which halogen is selected from the group consisting of bromine and iodine to be added to the solution in order to form the insoluble precipitate. Thus, for example, a bromine anion can be associated with each nitrogen center on the linear polymer, and either bromine or iodine can be added to the solution to form the novel precipitate having increased halogen content.

The result of the addition of the halogen source to the starting linear polymers of the invention, as indicated, is to increase the halogen content from a single anion at each nitrogen center to three halogen atoms or a trihalide at at least a sufficient number of the nitrogen centers to form the insoluble precipitate. Thus, where either $I^-$, $Cl^-$ or $Br^-$ is initially present at each nitrogen center, the resulting polymer will contain at least a sufficient number of trihalides at the nitrogen centers to form the precipitate. Such trihalides ions include $Br_3^-$, $I_3^-$, or $BrI_2^-$, $ClI_2^-$, $ClBr_2^-$ and $Br_2I^-$. In order to maximize the halogen content, it is preferable to minimize the number of carbon atoms between nitrogen centers in the starting polymer material. For example, in a polymer that will have a maximum amount of halogen, the distance between nitrogen centers in the linear backbone would be only 3 carbon atoms. However, when a rubbery backbone is desired, then the length of the chain between the nitrogen centers may be considerably larger. This of course will tend to decrease the percent of halogen content.

It has been found that the resulting insoluble salts of the invention can thus contain as much as 70 to 85 weight percent of bromine or iodine. The bromine or iodine in the polymers is much less volatile than bromine or iodine by itself. Thus the insoluble salts become a means for storing halogens.

In one novel aspect of the invention, the insoluble salts herein are formed in situ on an inorganic support. This can be readily accomplished by mixing the starting soluble polymers with a desired inorganic support in a suitable solvent medium for the polymer. Upon adding the halogen source to the solution and support, the insoluble salt of this invention is precipitated out on the surface of the inorganic support, thus coating it. The inorganic support thus can be cloth, fibers, particles or other types of material. It is believed that the invention will be better understood from the following detailed description and examples.

DESCRIPTION OF PREFERRED EMBODIMENTS

The starting material for the formation of the insoluble salts of the herein invention is a soluble linear polymeric quaternary ammonium salt. The quaternizable nitrogens can be disposed either in the backbone of the polymer or in side chains grafted to a polymeric backbone. The materials where the nitrogen centers are disposed in the backbone itself can be represented by the following general formula:

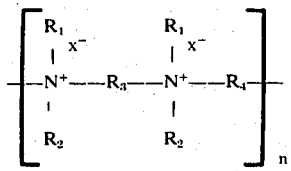

where:

$R_1$ and $R_2$ are each a hydrocarbon radical or may be joined into a single hydrocarbon radical. $R_3$ and $R_4$ are each an organic radical containing at least 3 carbon atoms, such as alkylene, alkenylene, arylene, aralkylene and alkarylene. In either $R_3$ or $R_4$ the carbon atoms may be interrupted with oxygen or sulfur such as alkyleneoxy or alkylenethio. $R_3$ and $R_4$ can also contain nitrogen such as in urethane groupings. $n$ is an integer representing the number of recurring units in the polymer chain, and X is a halogen selected from the class consisting of Cl, Br and I.

It is preferred in the above formula that $R_1$ and $R_2$ are preferably alkyl of 1 to 10 carbon atoms, or may be combined into a cycloalkene structure; $R_3$ and $R_4$ can contain up to 100 carbon atoms but preferably do not contain more than 20 carbon atoms; $n$ is such that the molecular weight is at least 1,000 and more preferably between 10,000 and 50,000. Though the above general formula is given as an example of typical linear quaternary ammonium salts, it should be well understood that any linear polymer containing quaternizable nitrogens which is initially soluble in a suitable media, can be treated in accord with the method of the herein invention to form a precipitated product.

Many soluble linear polymer quaternary ammonium salts are well known. These salts can, for example, be prepared by reacting in a polar medium, a polyamine of the above formula with a dihalide organic compound of the formula $X - R_4 - X$. The reactants, including exemplary amines and dihalo organic compounds, are well set forth in the above-mentioned copending application Ser. No. 678,501, now abandoned. As disclosed in that copending application, under particular reaction conditions, one can obtain linear polymers of high molecular weight previously not obtained in the prior art similar compounds. As pointed out in the copending application, by conducting the reaction between the diamine and dihalo organic compound under essentially ambient conditions, and through control of ratio of reactants one can obtain molecular weights in excess of 10,000.

It has additionally been found that the same reaction conditions as disclosed in the copending application will permit one to form the soluble polymeric salts with a minimum of three instead of four carbon atoms between the nitrogen centers. This is important particularly in the herein invention where it is desirable to maximize the weight percent of halogens in the resultant insoluble polymeric salt formed. The herein invention, however, is not limited to the method of forming the polymeric quaternary ammonium salts disclosed in the copending application, but further includes the lower molecular weight polymeric quaternary ammonium salts, as for example disclosed in U.S. Pat. Nos. 2,271,378 and 2,388,614. Thus, it should be established that any polymeric quaternary ammonium salt soluble in water or organic solvents is a suitable starting material in the present invention.

The insoluble salts resulting from aforegoing linear materials, as defined by the general formula, will vary in properties depending upon the distance between nitrogen centers. As has been indicated, as the distance between the centers decreases, a hard precipitated product is formed. As the distance tends to increase between centers, a more elastomeric rubbery material is achieved. For example, a polymer having the following general structure is illustrative of a starting material that is both elastomeric and possesses urethane type groupings containing unquaternizable nitrogens between nitrogen centers in a backbone.

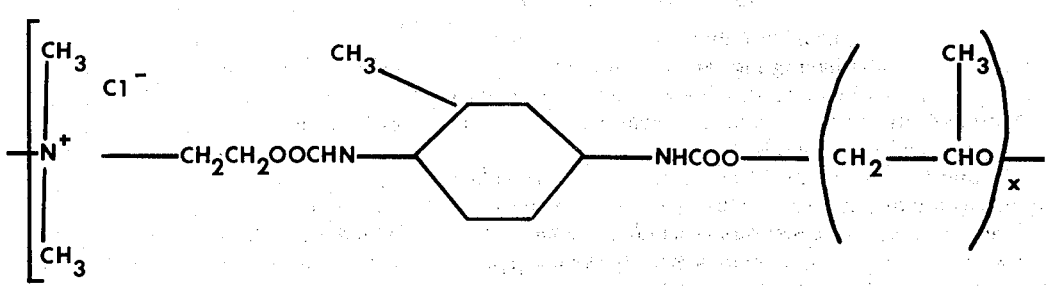

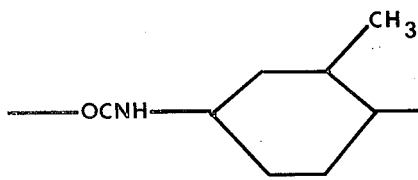 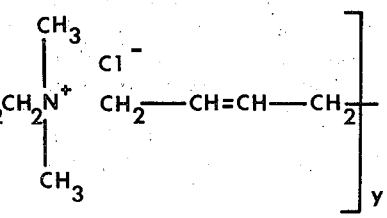

where $X$ and $y$ are positive integers.

The above formula of a urethane containing linear polymer is illustrative of the fact that the herein invention is applicable to virtually any linear polymer that has quaternizable nitrogens therein.

As has been indicated above, the quaternizable nitrogens do not necessarily have to be in the backbone of a linear polymer. These nitrogens can be, for example, located in side chains or as part of a side chain grafted onto the polymer backbone, or can be part of cyclic structures formed along the backbone of the polymer. Following is an example of a structure where the quaternizable nitrogens are not located in the backbone of the polymer chain but are pendant thereto.

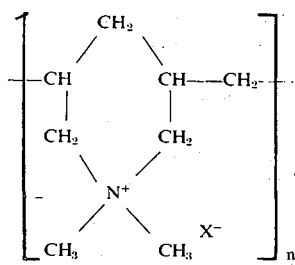

As pointed out above, in the starting soluble linear polymeric material, a halogen selected from the class consisting of $Cl^-$, $Br^-$ and $I^-$ is associated with each quaternary nitrogen center in the polymer. In forming the precipitated insoluble product of the herein invention, the halogen content at a sufficient number of the nitrogen centers is increased to the point where the desired product is formed. It has been found that the maximum halogen content is obtained when a trihalide exists at each nitrogen center in the precipitated insoluble polymeric product of the invention.

There are various routes that can be utilized to achieve the desired results of the invention. Each route or approach of course involves adding a source of halogen to the starting polymeric material, which source will provide additional halogens at the nitrogen centers. One approach involves adding either $I_2$ or $Br_2$ directly to the solution of the polymeric material. Alternatively, a solution of $I_2$ or $Br_2$ can be first formed, which solution in turn is added to the solution of the starting material. In this approach, it is preferred that the same halogen exists on the starting polymer material as that being added. For example, if $I_2$ is being added to the starting polymer, then it is preferred that an $I^-$ anion be associated with each nitrogen center. This will help to assure that a maximum amount of halogen, namely $I_3^-$, be disposed at each nitrogen center. However, it is possible to add the $I_2$ or $Br_2$ and form complex trihalides, such as $ClBr_2^-$, $IBr_2^-$, $ClI_2^-$ and $BrI_2^-$.

If it is desired to provide a trihalide at each nitrogen center, then it is obviously required to have enough halogen present from the halogen source to achieve this result based upon the amount of nitrogen centers in the starting material. In fact, it is preferred to have a considerable excess of the halogen source in order to achieve optimization of the conditions for the reaction. As has been indicated, the reaction is formed at ambient conditions of temperature and pressure. The termination of the reaction is apparent when no more precipitate is formed.

The aforegoing approach utilizing solely $I_2$ or $Br_2$ to be added to the starting polymer material is generally not as preferable as a second approach where a greater amount of the halogen can be put into solution. It is well known that $I_2$ and $Br_2$ do not readily go into solution and thus one must utilize a significant excess of these materials in order to provide a sufficient amount of them to achieve the results desired in the herein invention if the first approach is utilized. In order to aid these halogens going into solution, they are preferably mixed with a corresponding alkali metal halide in an aqueous solution. Thus, for example, a mixture of KI and $I_2$ in water can then be added to a starting polymer solution. It is believed that the mechanism involved is the formation of an alkali metal trihalide by the following reaction:

$$MX' + X'_2 \rightarrow MX'_3$$

where $X'$ is selected from the group consisting of I and Br and M is an alkali metal.

It is preferred that an excess of the alkali metal to halogen is used such as a mole ratio of 4:1 to better assure obtaining a solution of the iodine. However, an excess of $X'_2$ is possible. The reaction to produce $MX'_3$ will go to completion in the medium. It is postulated that the alkali metal ion, M, combines with the halogen on the soluble linear starting polymeric salt and removes it therefrom, forming a corresponding alkali metal halide. The removed halogen is then replaced with either $I_3^-$ or $Br_3^-$. For example, if the starting linear polymer has a Cl associated with the nitrogen centers and $MI_3$ is formed from MI and $I_2$, then $I_3^-$ will replace the Cl associated with the nitrogen center and MCl will be formed in a solution containing water. MCl will remain dissolved in a water containing media and therefore can be easily separated from the water-insoluble salts of this invention. Even when a polar organic solvent, for example, is used to dissolve the starting soluble linear polymer, water will be present in the resulting mixture when the halogen and alkali metal halide aqueous solution is added thereto. Once again, it makes no difference whether the halogen associated with the nitrogen center is the same as the halogen to be added. Thus, for example, an alkali metal triiodide can be added to a polymer having iodine anions associated with the nitrogen centers.

As can be appreciated from the fact that it is preferred to place three halogen atoms at each nitrogen center, the stoichiometric requirements are 1 mole of $MX'_3$ to be produced for each nitrogen center in the polymer chain. However, to assure this it is further preferred to utilize excess of the solution of $MX'/X'_2$ to assure sufficient production of $MX'_3$.

The reaction to form the herein insoluble salt is very simple and straightforward in that it is carried out at ambient conditions of temperature and pressure. The insoluble precipitate is then easily separable from the solution. The formed novel salts have been found to have halogen contents as high as 85 weight percent. These resulting trihalides are much less volatile than either bromine or iodine by itself, thus making them a useful means for storing these halogens. Further, the herein trihalide salts are endowed with high bacteriocidal activity. It is believed that the invention will be further understood from the following examples:

EXAMPLE I

A soluble linear polymeric quaternary ammonium salt having the formula

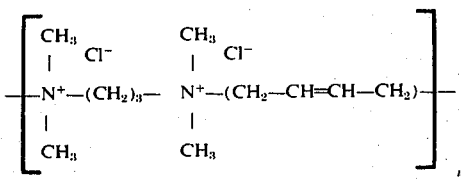

was formed. 9.94 grams of N'N'-tetramethyl-1, 3-diaminopropane and 9.55 gram of trans-1, 4-dichloro butene was added to 77 ml of dry methanol. This produced an exothermic reaction. The materials were left in a stoppered flask for 3 days. The solution was then evaporated and the remaining product dissolved in a minimum quantity of dry methanol which was then poured into 500 ml quantity of dry acetone whereupon a precipitate formed. This solution was then stirred vigorously overnight in order to pulverize the precipitate. The acetone solution was then filtered through a medium porosity sintered glass filter, washed quickly with dry acetone, and placed in a vacuum drying oven at 25°C for two days. This yielded 89% by weight of the polymer, which had an intrinsic viscosity in 0.4M KBr of 0.22 dl/g.

EXAMPLE II

In this example, a soluble polymer having the formula

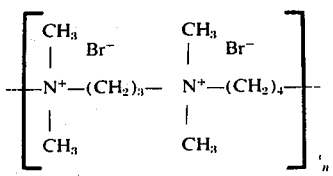

was formed by dissolving 6.26 grams of N,N,N',N'-tetramethyl-1,3-diaminopropane and 10.4 grams of 1,4-dibromobutane in 25 ml methanol. The resulting solution was equilibrated at 25°C for one week. Immediately prior to isolating the product, an aliquot was analyzed for unquaternized amine, which was found to be 0.5 % of the initial monomer material. The solvent was then flash evaporated and the resulting polymer dried under vacuum at 40°C for 24 hours, yielding 16.7 grams of a polymer which was equivalent to an 88% by weight yield. An amine analysis of the dry polymer gave 3.4 × 10⁻⁶ equivalent amine functional groups per gram of dried polymer. The bromine analysis gave 42.6% ionic Br⁻ compared to a theoretical value of 46.2% Br. The intrinsic viscosity of the polymer formed as determined in 0.5 M KBr was 0.194 dl/g.

EXAMPLE III

In this example, a polymer having the formula

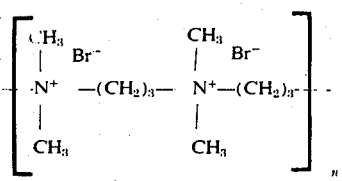

was produced by dissolving 3.25 grams of 1,3-tetramethyl-1,3-diaminopropane and 5.05 grams of 1,3-dibromopropane in 25 ml of a solvent containing dimethyl formamide and methanol in equivalent amounts. The solution was left at ambient temperature for 4 days until it had solidified. The mixture which precipitated when added to dry acetone, was crushed, filtered and dried for 2 days under vacuum. The intrinsic viscosity as determined in 0.4 M KBr was 0.068 dl/g.

As can be seen from the foregoing examples, a soluble linear polymeric quaternary ammonium salts having three or four carbon atoms between nitrogen centers were readily formed under mild reaction conditions. Such materials as formed in Examples I–III are preferred in the practice of the herein invention to be used as starting materials, since they enable one to maximize the percentage of halogens that can be contained in these types of polymers, due to the closeness of the nitrogen centers along the linear chain.

The following examples are directed to forming the insoluble salts of the present invention utilizing the materials formed in Examples I–III:

EXAMPLE IV

An insoluble salt was formed having the general formula

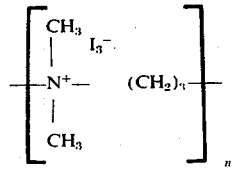

by dissolving 3.3 grams of the polymer formed in Example III in 20 cc of water. An aqueous solution of 130 cc was additionally formed by dissolving 13.3 grams of KI and 5.1 grams of I₂ in water. This aqueous solution was then added slowly with stirring to the dissolved polymer. A dark brown precipitate was formed. This precipitate was filtered, washed with water and dried. The yield of the resulting water-insoluble precipitate formed was 9.3 grams. Its bromine content was less than 2% and the iodine content was 82.1 weight percent.

EXAMPLE V

An insoluble salt of this invention having the general formula

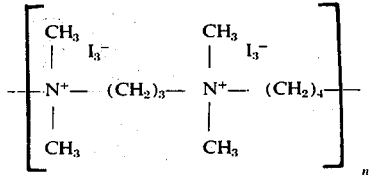

was prepared by utilizing the material formed in Example II, repeating the same procedure and utilizing stoichiometric quantities of reagents as set forth in Example IV. The yield of a water soluble precipitate was 9 grams. The iodine content was 80.04 weight percent.

EXAMPLE VI

An insoluble salt of the invention having the general formula

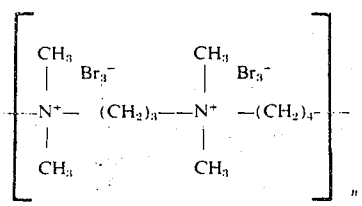

was made by dissolving 3 grams of the material made in Example I in 20 cc of water. To this solution was slowly added an aqueous solution containing 0.8 mole of KBr and 0.02 mole of $Br_2$ dissolved in 130 cc of water. Upon slow stirring a reddish brown precipitate was formed. This precipitate was filtered, washed with water and dried. Only small amounts of chlorine were found in the resulting product. The bromine content of the product was determined to be 72 weight percent.

EXAMPLE VII

In this example, a starting soluble polymer having the general formula

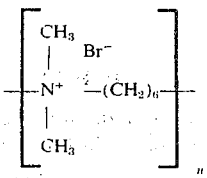

was utilized. This material had an intrinsic viscosity in 0.4M KBr of 0.5 dl/g. 83.0 grams of the polymer was dissolved in 800 cc of water. To this was added a solution having 132.8 grams of KI and 40.6 grams of $I_2$ dissolved in 800 cc of water. Upon slow stirring a precipitate was formed which was then filtered, washed with water and dried. The yield of a product having the formula

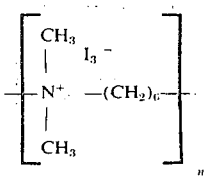

was 23.5 grams. The iodine content was found to be 75 weight percent.

One novel aspect of the herein invention is the precipitation in situ of the insoluble polymer salts on a suitable substrate material. Virtually any substrate that is nonreactive with the products of the invention and would be insoluble in water could be utilized. The substrates are merely immersed in the solution containing the soluble starting polymer. Upon addition of the mixture of the alkali metal halide and halogen, the precipitate of the insoluble salt of the invention forms a coating on the substrate in the solution. Typical substrates could include inorganic materials such as silica gels, clays, diatomaceous earth, cloths and the like. With the use of material such as various cloths, the cloth can for example be dipped into a solution of the starting polymer which is allowed to soak into it. The soaked cloth can then be removed from the solution and then dipped into a solution of the alkali metal halide and halogen, whereupon the insoluble salt of the invention is formed on and absorbed within the cloth itself. Such cloths can then be particularly utilized as bandages and the like to inhibit bacterial growth. The following examples are directed both to the formation of the product of this invention on suitable substrates and the bacterial inhibition properties.

EXAMPLE VIII

In this example, the product formed in Example IV was precipitated on a Dacon cloth which became resistant to Gram+ and Gram− bacteria. One square centimeter of the Dacon cloth, which was of the type used for arterial prosthetic devices, was immersed in a 5 weight percent aqueous solution of the soluble polymer shown in Example VII. The cloth was kept in the solution for 30 minutes. After air drying, the sample was then immersed in an aqueous solution of $KI/I_2$ for 30 minutes. The cloth was then washed with water, dried, and submitted to a zone inhibition test with *Staphylococcus aureus* (Staph) and *Escheria coli* (E. coli). Results of the test show that a 1.5 mm width of a bacterialfree inhibition zone was obtained with the Staph and a 1.5 mm inhibition zone was obtained with the E. coli.

EXAMPLE IX

One milligram of the insoluble polymeric salts formed in Example VII was submitted to zone inhibition tests which comprised placing the sample of salt in a agar-agar culture of *E. coli* or *Staphylococcus aureus*. The results of the test indicated that the width of the bacteria-free zone with the Staph. was 13 mm and the E. coli, 10 mm. As can be seen the inhibition zone in this example was much greater than that in Example VIII. However, it should be realized, of course, that the pure material was utilized and thus its concentration was much greater than when used as a coating for the dacron cloth.

EXAMPLE X

Silk sutures used in surgery were immersed in a 5% solution of either water or methanol containing the soluble polymers used as starting materials in Examples V and VII respectively. The resulting sutures after being dried in vacuum thus contained a coating or impregnation of the insoluble salts formed in Examples V and VII. The sutures increased in weight about 50% due to the presence of the insoluble salt. The coated or impregnated sutures were then subjected to a series of zone inhibition tests, the results of which are indicated in the following table:

TABLE

|  | Polymer Type (Example) | Solvent | Width of bacteria free inhibition zone (mm) |
|---|---|---|---|
| Staph. | (5) | Methanol | 2.5 |
| E. coli | (5) | Methanol | 3.0 |
| Staph. | (5) | $H_2O$ | 4.0 |
| E. coli | (5) | $H_2O$ | 3.5 |
| Staph. | (7) | $H_2O$ | 2.5 |
| E. coli | (7) | $H_2O$ | 6.0 |

EXAMPLE XI

Coarse grade silica gel was coated with an insoluble polymer of the type prepared in Example V. One gram of the silica gel was immersed in an aqueous solution containing 10 weight percent of the starting soluble polymer of Example V. The thus treated silica gel was then filtered, dried and then stirred into an aqueous solution of KI and $I_2$. The resulting polytriiodide of the type formed in Example V became firmly bound to the silica gel and could not be washed off with water. The coated silica gel was found to have bacteriostatic activity through a zone inhibition test.

EXAMPLE XII

Example XI was repeated utilizing a finely divided silica gel. The product was strongly bacteriocidal as shown by the zone inhibition test.

EXAMPLE XIII

Dry dihydroxypolypropylene glycol of approximate molecular weight 2000 (100g) was reacted with tolylene diisocyanate (17.5g) at 60°C for 18 hours. The reaction was followed by means of I.R. spectra. The disappearance of the OH peak at $\lambda=3480$ cm$^{-1}$ (2.88$\mu$) indicated reaction completion.

After cooling to room temperature 2-dimethylaminoethanol (DMAE) (8.9 g) was added while stirring. The reaction mixture was heated to 60°C for two hours. The disappearance of the NCO absorption peak at $\lambda=2280$ cm$^{-1}$ (4.38$\mu$) showed the end of reaction. After removal of excess DMAE in a vacuum evaporator, the dimethylamino content of the polymer was determined by an acid base back titration method.

Molecular weight of the dimethylamino-end capped prepolymer based on the amine titration was found to be 2514. Stoichiometric amounts of prepolymer and trans 1-4 dichloro-2-butene were introduced into a glass vessel, stirred, sealed, and heated at 50°C for 24 hours. At the end of the reaction, a rubbery product was obtained.

The purification consisted of precipitation of the polymer with a mixture of benzene and n-hexane from a methanol solution. After washing with n-hexane the polymer was dried under vacuum at 50°C for 48 hours. A similar procedure was applied to polypropylene glycol (PPG) of several molecular weights, namely PPG of molecular weights 1,000, 2,000 and 4,000. For PPG of molecular weights 150 and 450 dry benzene was used as solvent to prepare dimethylamino end capped prepolymer which was semi-crystalline after reaction with the dichlorobutene.

The formed polymers had the following structure:

The polymers were dissolved in methanol and treated with an aqueous solution of KI and $I_2$. A rubbery product precipitated when the high molecular weight materials were used. For PPG 150 and 450, a precipitated semi-crystalline product was obtained. The iodinated precipitated products were found to be bacteriostatic by zone inhibition tests.

EXAMPLE XIV 6.0 grams of a polymer containing $N^+$ in the side chain made by the Calgon Co. and known as Cat-Floc, the structure of which is shown below:

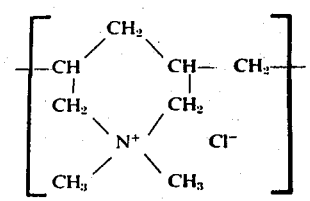

were dissolved in 40 ml of water. An aqueous solution of KI/$I_2$ (50 ml containing 5 g of KI and 3.9 g of $I_2$) was added to it. The precipitated polyiodide after filtration and drying weighed 11.6 g. It was shown to be bacteriostatic towards E. coli and S. aureus by zone inhibition tests.

EXAMPLE XV

Example VII was repeated. However, the iodide was used instead of the bromide in the initial water soluble polymer. 1.02 grams of the polymer was dissolved in 10cc $H_2O$. A solution of 0.406gm of iodine in 1400cc $H_2O$ was added. Upon slow stirring a precipitate was formed. The yield of the product was 0.18 gram. The iodine content was found to be 74%.

What is claimed is:

1. A method of forming a coated substrate comprising the steps of:

dissolving in a solvent a linear, quaternary ammonium polymer salt having a molecular weight of at least 10,000 and having the general formula:

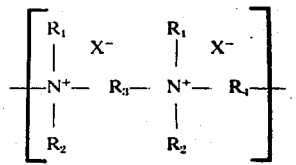

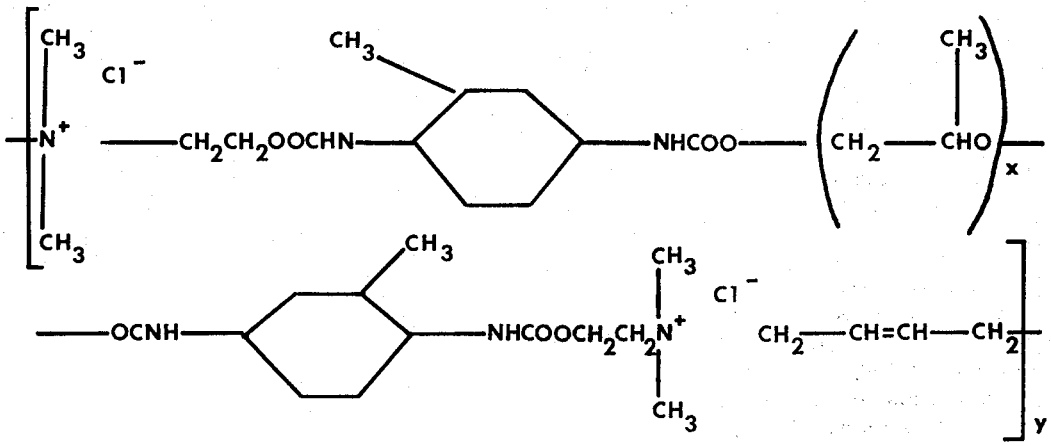

where $R_1$ and $R_2$ are each alkyl of 1–10 carbon atoms; $R_3$ and $R_4$ are each alkylene, alkenylene, arylene, aralkylene, alkarylene, alkyleneoxy or alkylenethio of 1 to 100 carbonatoms; $n$ is an integer greater than 2; and $X^-$ is a halogen selected from $Cl^-$, $Br^-$ and $I^-$;

immersing the substrate in said solution; and adding to the solution a halogen source selected from the group consisting of $Br_2$ and $I_2$ in an amount sufficient to precipitate on the substrate an insoluble quaternary ammonium polymer salt containing trihalide ions selected from $Br_3^-$, $I_3^-$, $BrI_2^-$, $ClI_2^-$, $ClBr_2^-$, and $Br_2I^-$.

2. The method of claim 1 wherein said substrate is solid particulate inorganic material.

3. The method of claim 1 wherein said substrate is a fibrous material.

4. The method of claim 1 wherein said soluble polymer salt solution is formed by dissolving said salt in a solvent selected from the group consisting of water and organic polar solvents.

5. The method of claim 1 wherein said halogen source comprises a mixture of $I_2$ and $KI$.

6. The method of claim 1 wherein said halogne source comprises a mixture of $Br_2$ and $KBr$.

7. The method of claim 1 wherein said soluble salt contains one halogen atom per each nitrogen in the polymer and further providing:

contacting said soluble salt with sufficient additional halogen to obtain three halogen atoms for at least some of the nitrogens in the polymer sufficient to form said insoluble product.

8. A method according to claim 1 in which the insoluble polymer salt contains 70–85 weight percent halogen.

9. A method according to claim 1 in which there are at least 3 carbon atoms separation between nitrogen atoms in the backbone of the polymer.

10. A method according to claim 1 in which $R_3$ and $R_4$ contain 3–4 carbon atoms.

11. The method of claim 3 wherein said substrate is a surgical suture.

12. The method of claim 3 wherein said substrate is a cloth.

13. A substrate having deposited thereon an insoluble trihalide salt of a linear quaternary ammonium polymer having a molecular weight above 10,000 and having the general formula:

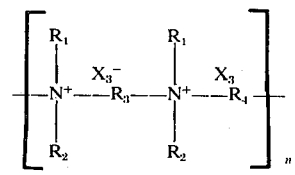

where $R_1$ and $R_2$ are each alkyl of 1–10 carbon atoms; $R_3$ and $R_4$ are each alkylene, alkenylene, arylene, aralkylene, alkarylene, alkyleneoxy or alkylenethio of 1 to 100 carbon atoms; $n$ is an integer greater than 2; and $X_3^-$ is a trihalide ion selected from $Br_3^-$, $I_3^-$, $BrI_2^-$, $ClI_2^-$, $ClBr_2^-$ and $Br_2I^-$.

14. The product of claim 13 wherein said substrate is solid particulate inorganic material.

15. The product of claim 13 wherein said substrate is fibrous material.

16. The product of claim 15 wherein said substrate is a surgical suture.

17. The product of claim 15 wherein said substrate is a cloth.

18. The substrate of claim 13 wherein said salt is formed from the reaction of linear polymer containing quaternizable nitrogens dissolved in a solvent with a halogen source under conditions sufficient to add halogen to said linear polymer at said nitrogens and precipitate the resulting halogen containing polymer salt from said solution.

* * * * *